United States Patent [19]
Kelly et al.

[11] Patent Number: 4,630,028
[45] Date of Patent: Dec. 16, 1986

[54] PRESSURE-BIASED, TEMPERATURE SENSOR

[75] Inventors: Robert R. Kelly, Hoffman Estates; Morley S. Smith, Mount Prospect, both of Ill.

[73] Assignee: Borg-Warner Corporation, Chicago, Ill.

[21] Appl. No.: 728,737

[22] Filed: Apr. 30, 1985

[51] Int. Cl.[4] .............................................. B60Q 1/00
[52] U.S. Cl. ...................................... 340/60; 340/611; 340/614; 340/626; 340/59; 73/118.1; 73/708; 73/714; 73/729; 374/203; 374/145; 374/146; 200/83 C; 200/83 D
[58] Field of Search ................. 340/521, 60, 59, 588, 340/589, 590, 591, 592, 603, 605, 611, 614, 612, 618, 622, 626; 374/142–146, 203; 73/118, 708, 714, 729; 200/83 R, 83 A, 83 B, 83 C, 83 D, 81 R, DIG. 5

[56] References Cited

U.S. PATENT DOCUMENTS

| | | | |
|---|---|---|---|
| 1,815,642 | 7/1931 | Zubaty . | |
| 1,933,453 | 10/1933 | Schlaich . | |
| 2,943,167 | 6/1960 | Hughes et al. | 200/83 D |
| 3,161,740 | 12/1964 | Schniers et al. | 200/83 C |
| 3,338,099 | 8/1967 | Remick, Jr. | 374/145 |
| 3,439,356 | 4/1969 | Kinzer | 374/143 |
| 3,597,977 | 8/1971 | Zier | 374/203 |
| 4,051,728 | 10/1977 | Metz . | |
| 4,237,354 | 12/1980 | Rockenfeller et al. | 73/729 |

Primary Examiner—Donnie L. Crosland
Attorney, Agent, or Firm—Florian S. Gregorczyk

[57] ABSTRACT

A pressure-biased, temperature sensor for monitoring a fluid system for either an over-temperature or under-pressure condition. The sensor includes a bellows operator immersed in the fluid of a coolant system. The bellows operator expands in response to changes above a predetermined temperature or below a predetermined pressure to complete a signal circuit and energize a signal means.

12 Claims, 5 Drawing Figures

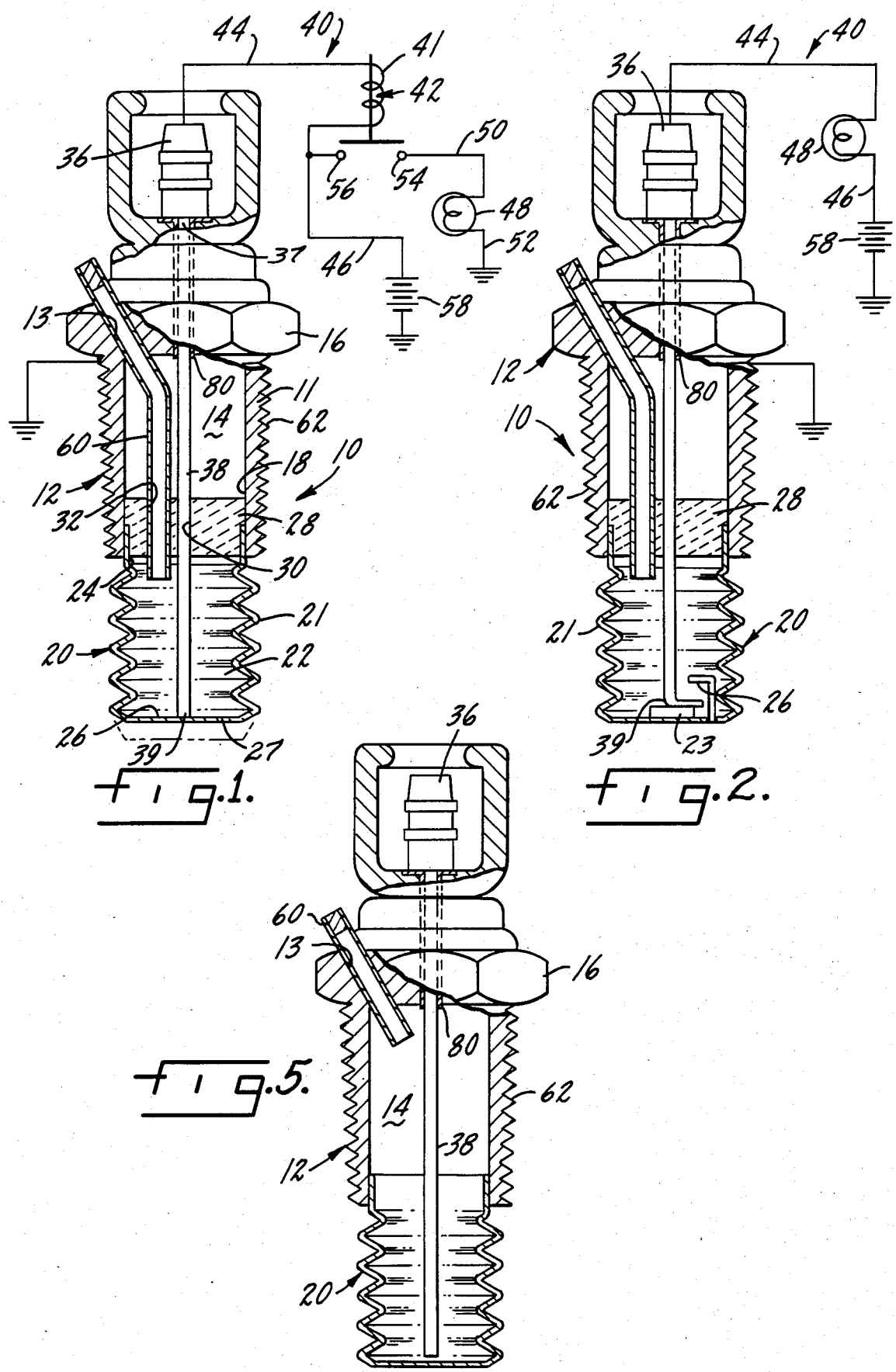

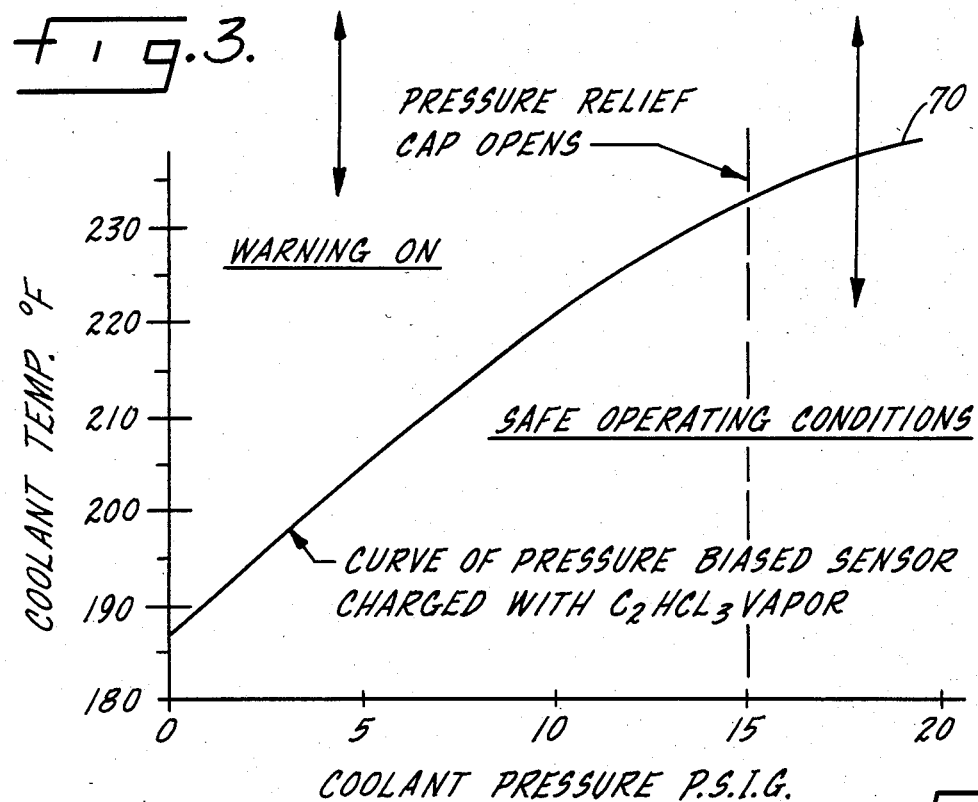
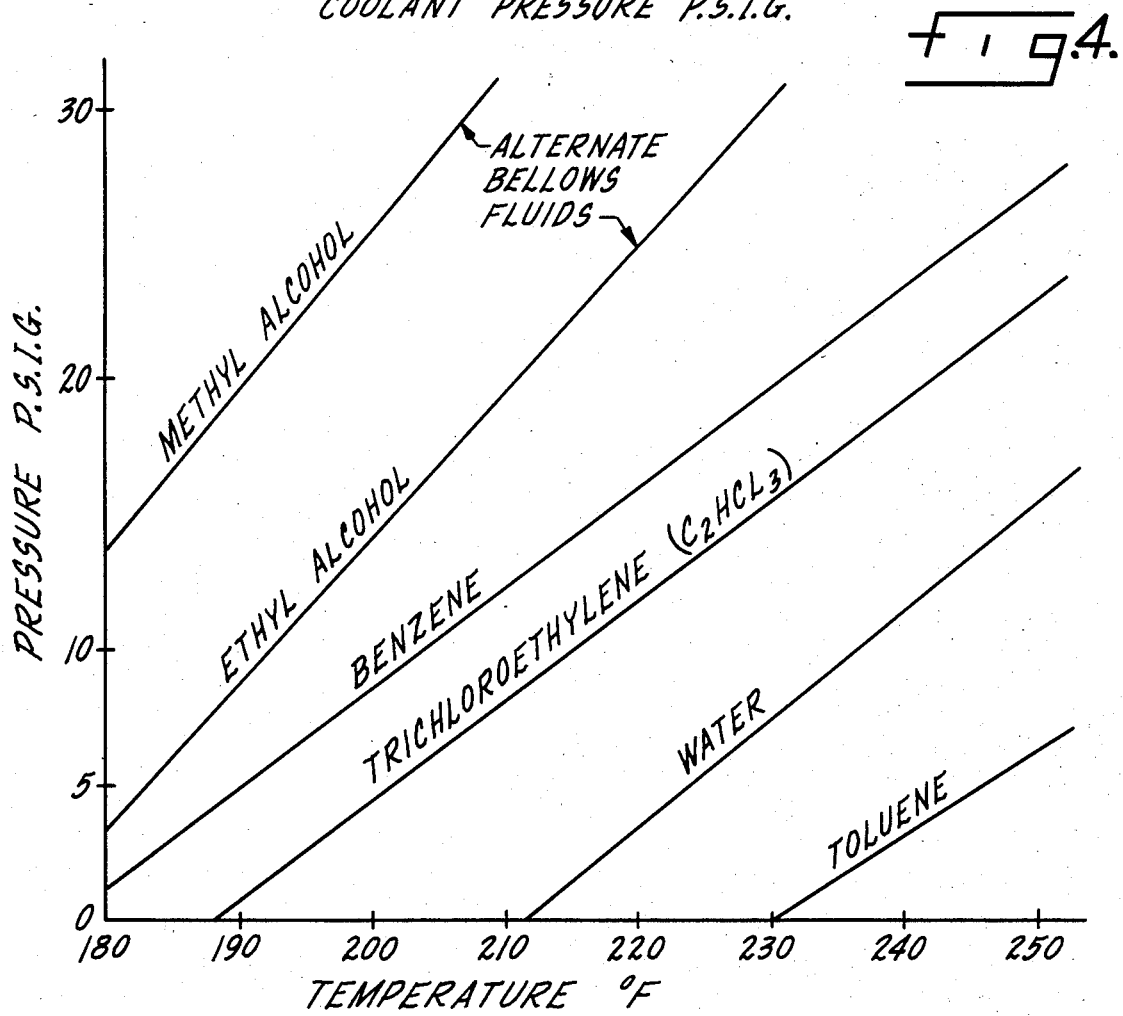

PRESSURE-BIASED, TEMPERATURE SENSOR

BACKGROUND OF THE INVENTION

1. Field of the Invention

This invention discloses a multiple function sensing means for a fluid system. More specifically, this invention relates to a sensor for a vehiclular coolant system. The sensor is a compact structure to monitor under-pressure and over-temperature in a coolant system, and provides a signal means indicative of a malfunction. Coolant can boil away at normal operating temperatures if the system is open, such as with a ruptured hose or loose radiator cap.

2. Prior Art

Monitoring devices and sensors for fluid systems are known in the art, particularly temperature sensing apparatus for automobile coolant systems. There have been efforts to provide both over-pressure and over-temperature sensing devices, but not an under-pressure and over-temperature sensor. Indicative of this prior art is U.S. Pat. No. 3,439,356 (Kinzer) which discloses a pressure-temperature sensor. In this apparatus, opposed bellows chambers are coupled by a movable electrically conducting disc, which is displaced between a tube end and a thermocouple junction. The disc is moved to contact the thermocouple switch to energize a signal means and thereafter the disc is adjusted with a fluid at a known pressure to disclose an accurate pressure reading. The thermocouple is utilized in a known fashion to yield the temperature of a surrounding fluid.

U.S. Pat. No. 1,933,453 (Schlaich) teaches an indicating device responsive to both temperature and pressure. However, this device requires a coil resistor 13, a temperature coil shown as bimetal coil 16, and a diaphragm operator 24. The diaphragm operator 24 is responsive to an excess pressure to open a circuit. This device provides a current from a battery (not shown) to the end of resistor coil 13 and wiper 14 which is operable by diaphragm 24. The temperature actuation, although reasonably accurate at most temperatures, is inadequate to move the indicator for its entire distance or stroke. However, at an overheated condition sufficient for the liquid to boil vigorously, an excess pressure is disclosed that will actuate the diaphragm to move the indicator for substantially its entire travel range. A drawback noted in this device is, that until vigorous boiling occurs, the thermometer or temperature indicator does not accurately indicate the water temperature due to the difference between the water temperature and air temperature of the space surrounding the temperature responsive instrument.

U.S. Pat. No. 3,338,099 (Remick, Jr., et al) teaches a boiling point indicator which utilizes two sensors, one for pressure and one for temperature. A diaphragm operator moves a mechanical indicator. There is no teaching of an electrical signal provided for such readings. This particular device is operable only as an indicator of a safe-unsafe temperature.

U.S. Pat. No. 4,051,728 (Metz) teaches an instrument for monitoring a physical parameter, either temperature or pressure, utilizing an elastic sensor displaceable as a function of the monitored physical parameter. However, it is capable of only monitoring one parameter at a time. The device requires a belt having characteristics which change along the length thereof. The elastic sensor is responsive to the belt characteristic to produce an output signal which varies as a function of the physical parameter being monitored. Such a device is impractical for most automotive or vehicular usages.

Illustrative of early efforts at monitoring fluid bath temperatures is U.S. Pat. No. 1,815,642 (Zubaty) illustrating a bellows filled with a heat responsive fluid, which bellows is immersed in a fluid bath. A mechanical arm is connected between the bellows and a temperature indicator. As the fluid within the bellows is heated, the bellows is permitted to expand to move the mechanical arm and indicate the temperature. There is no teaching or consideration of pressure measurement.

Most vehicle coolant systems are operated at an elevated pressure which permits them to operate at a higher temperature. Generally these coolant systems are provided with relief valves to protect against an over-pressure condition. At a lower pressure the coolant will boil and evaporate from the system at a lower temperature. Therefore, it is vital to be forewarned of an under-pressure condition as well as an over temperature condition in these coolant systems. The above devices, which require immersion in or communication with a fluid to sense either over-temperature or over-pressure, do not provide a means for measuring both an over-temperature condition and an under-pressure condition. The under-pressure condition prevails when the system fluid pressure is lost from a cooling system, such as by a loose radiator cap.

SUMMARY OF THE INVENTION

A pressure-biased, temperature sensor constructed in accordance with the invention includes a housing having a chamber with an open end, and a bellows also having an open end; the housing and bellows being joined at their open ends. A conducting terminal is mounted on the housing closed end with an insulator means therebetween. A reference conductor extends from the conducting terminal through said housing chamber and bellows cavity. A signal circuit is provided and includes a signal means that is energized by a completed circuit at contact of the bellows and reference conductor. The bellows is operable by a vapor which is responsive to changes in temperature and pressure. As the temperature of the environment increases, the vapor expands with either a temperature increase or external pressure decrease, and the bellows expands to complete the signal circuit. The sensor provides a low pressure bias to the over-temperature alarm.

BRIEF DESCRIPTION OF THE DRAWING

In the figures of the drawings, like reference numerals identify like components, and in the drawings:

FIG. 1 is a cross-section of a schematic illustration of a pressure-biased, temperature sensor;

FIG. 2 is an alternative embodiment of a pressure-biased, temperature sensor;

FIG. 3 is a graphical illustration of an operating curve for a pressure-temperature sensor; and FIG. 4 illustrates a family of vapor pressure-temperature curves for various fluids utilized in sensors; and FIG. 5 is a cross-section of a schematic illustration of the embodiment in FIG. 1 with a single chamber.

DETAILED DESCRIPTION OF THE INVENTION

In FIG. 1, a pressure-biased, temperature sensor [PBTS] 10 is shown with a housing 12 having a wall 11 defining a chamber 14, a closed end 16, an open end 18 and a through-bore 13 in wall 11. A bellows 20, which may be formed of a metal such as copper, includes a side wall 21 defining a bellows cavity 22, an open end 24 and a conducting contact surface on lower wall 27 26 closing the opposite end. The open ends 18 and 24 of housing 12 and expandable bellows 20, respectively, are mated with each other, however, an electrically insulating seal 28 is provided in the mating area. Communication between housing chamber 14 and bellows cavity 22 is sealed by seal 28, which seal 28 defines a passage 30 and a through bore or port 32 communicating between chamber 14 and cavity 22.

A conducting terminal 36 is positioned on housing closed end 16 with an insulator means 80 mounted between housing 12 and terminal 36. A reference conductor means 38 with a terminus 39 and an opposite end 37 is coupled to conducting terminal 36 and extends through insulator means 80, housing chamber 14, passage 30 and bellows cavity 22 to contact conducting contact surface 26 of bellows 20. Reference conductor means 38 is insulated from housing 12, and seals passage 30 of seal means 28. In this embodiment, the lower surface of bellows wall 21 is utilized as contact surface 26.

A signal circuit 40 includes a normally-closed relay 42 with a winding 41 and conducting means 44 and 46 in a series circuit. A parallel circuit of said signal means circuit 40 has a signal means 48 with conductor means 50 and 52 connected in parallel with series circuit 42, 44, 46. Conductor means 50 is connected between a contact point 54 of relay 42 and signal means 48. A second contact means 56 of relay 42 is coupled to conductor means 46. Relay 42 normally contacts and provides communication across contacts 54 and 56. Coupled to conductor means 46 is a source of electrical energy 58. Housing 12 and bellows 20 may be electrically conductive materials. Further, seal means 28 is an insulating device such as a ceramic seal. A filler tube 60 extends through bore 13 and through bore 32 to provide a fluid to evacuated bellows cavity 22. Thereafter, tube 60 is sealed. Further, tube 60 seals through-bore 32 of seal means 28 to inhibit communication between chamber 14 and cavity 22.

In FIG. 1, first conductor means 44 is connected between conducting terminal 36 and relay 42. Second conductor means 46 is coupled between relay 42 and housing 12. In this embodiment, housing 12 and bellows 20 are electrically conductive materials. At the reference position, reference conductor 38 and contact surface 26 are touching to complete a circuit through relay 42 and conductors 44 and 46, thereby maintaining relay 42 in the open position. Signal means 48 is not energized when conductor 38 and contact surface 26 communicate.

FIG. 5 illustrates an alternative embodiment wherein the seal means 28 is not provided to maintain reference conductor 38 insulated from housing 12. In this embodiment, housing 12 and bellows 20 cooperate to define chamber 14. Through-bore 13 of housing 12 is sealed by tube 60, which is itself sealed after fluid is introduced into chamber 14. It is only requisite that reference conductor 38 be insulated from housing 12 and that chamber 14 be adequately sealed against leakage. Insulator 80 is provided to isolate and insulate reference conductor 38 from the housing as well as to insulate terminal 36. Sleeve like insulator 80 may be provided in any of the embodiments about the length of reference conductor 38 extending through closed end 16 of housing 12.

In operation housing 12, illustrated with screw threads 62, is mounted in a coolant circuit such as an automotive radiator or engine block (not shown), and bellows 20 extends into the coolant fluid. The vapor fluid in bellows 20 is responsive to changes in temperature and pressure, and expands as a function of such changes. In the reference mode illustrated in FIG. 1, reference conductor 38 touching contact surface 26 closes circuit 40 and maintains relay 42 in the open position. As the temperature of the coolant increases, the vapor pressure within the bellows increases. Illustrative of such a change is the effect shown in FIGS. 3 and 4. In FIG. 3 a curve 70 illustrates the change of pressure as a function of temperature for a given vapor fluid and notes an area below the curve labelled "safe operating condition". Below the curve 70, bellows 20 will remain contracted to maintain the closed circuit of FIG. 1. However, above the curve in the area noted as "warning on", the vapor expands in bellows cavity 22 to disengage contact surface 26 from terminus 39 and open circuit 40. When circuit 40 is open relay 42 closes, connecting contacts 54 and 56, and completing the parallel circuit to energize signal means 48.

FIG. 4 illustrates a family of curves for various liquids that may be provided to bellows cavity 22. These curves demonstrate the change in vapor pressure with changing temperatures. Therefore, a specific response can be acquired either by altering the particular bellows composition and its reaction rate at a given temperature or pressure or the fluid in the bellows. In addition to the temperature effect, a drop in fluid pressure at a given temperature will likewise effect the expansion of bellows 20. In FIGS. 1 and 5, a loss of coolant from the fluid system results in a decrease in the fluid pressure surrounding bellows 20, allowing bellows 20 to expand and open the circuit and thus closing relay 42 to complete the parallel circuit to energize signal means 48.

FIG. 2 illustrates an alternative embodiment of the above-noted invention wherein a seal means is shown but is not a requisite for the invention, and terminus 39 is in proximity to the lower surface of bellows 20. Conducting contact 26 extends from bellows wall 21 to contact terminus 39 at bellows 20 expansion. First conducting means 44 of circuit 40 is coupled between terminal 36 and signal means 48. Second conducting means 46 is connected between signal means 48 and housing 12. A power supply or means of energization 58 may be coupled to conducting means 46 to provide a source of energy to energize signal means 48. In this embodiment, circuit 40 is a series circuit and reference conductor 38 is not in contact with contact means 26. Therefore, as bellows 20 expands, contact means 26 contacts terminus 39 to close circuit 40, completing the circuit and energizing signal means 48. An insulator 23 is provided on wall 21 to insulate terminus 39 from wall 21.

Those skilled in the art will recognize that certain variations can be made in the illustrated embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

We claim:

1. A pressure-biased, temperature sensor means to monitor a fluid system comprising:
   a housing defining a chamber having a closed end and an opposite open end, an expandable bellows with a fluid therein, a reference conductor means and a conducting terminal on said closed end;

an insulator means positioned between said conducting terminal and said housing closed end;

said bellows having a sidewall, an open end and a lower wall opposite said open end, said bellows secured to said housing at the open end thereof with said housing and bellows open ends coinciding;

said reference conductor means being insulated from said housing and defining a terminus and an opposite end;

said reference conductor opposite end contacting said conducting terminal and said terminus being in proximity to said bellows lower wall with said reference conductor extending therebetween through said bellows, said chamber, housing closed end and said insulator means;

conductive contact means communicating with said bellows wall;

a signal circuit including a signal means and a source of electrical energy connected between said conducting terminal of said housing and said bellows lower wall;

the improvement comprising said fluid containing bellows contacting the fluid of a fluid system and being expandable in response to changes in pressure and/or temperature in said fluid system below a predetermined pressure level or above a predetermined temperature level to energize said signal means.

2. A pressure-biased, temperature sensor means as claimed in claim 1, wherein said bellows is metal.

3. A pressure-biased, temperature sensor means as claimed in claim 2, wherein said metal bellows is copper.

4. A pressure-biased, temperature sensor means as claimed in claim 2, wherein said housing is an electrically conductive material coupled between said source of electrical energy and said bellows.

5. A pressure-biased, temperature sensor means as claimed in claim 1, wherein said housing defines a bore through said sidewall communicating between atmosphere and said housing chamber;

a fill tube extending into said chamber from the atmosphere, through said sidewall bore to fill said bellows with a fluid, which tube is thereafter sealed.

6. A pressure-biased, temperature sensor means as claimed in claim 1, wherein said bellows has an insulator positioned on said lower wall to provide a nonconductive contact for said reference conducting means terminus.

7. A pressure-biased, temperature sensor means as claimed in claim 1, wherein said signal circuit is completed by contact between said reference conductor terminus and said conductive contact means.

8. A pressure-biased, temperature sensor means as claimed in claim 2, wherein said terminus contacts said bellows lower wall in a reference position;

said circuit having said signal means and source of electrical energy coupled in parallel and further comprising a normally-closed relay having a winding coupled in series with said conducting terminal and said source of electrical energy, which relay means is operable to complete the circuit between said signal means and said source of electrical energy.

9. A pressure-biased, temperature sensor means as claimed in claim 8, wherein said normally-closed relay means is maintained open during contact between said terminus and said bellows lower wall.

10. A pressure-biased, temperature sensor means as claimed in claim 1, and further comprising a nonconducting seal means positioned in said coinciding open ends to seal communication between said chamber and said fluid-filled bellows, which seal means defines a passage through which said reference conductor means extends and seals said passage.

11. A pressure-biased, temperature sensor means as claimed in claim 10, wherein said seal means is a ceramic material.

12. A pressure-biased, temperature sensor means as claimed in claim 10, wherein said seal means further defines a port communicating between said housing chamber and said bellows cavity;

said housing defining a bore through said sidewall communicating between atmosphere and said housing chamber;

a fill tube extending into the bellows from the atmosphere, through said sidewall bore, said chamber and said seal means port to fill said bellows with a fluid, which tube is thereafter sealed.

* * * * *